United States Patent [19]

Porter et al.

[11] Patent Number: 5,207,352
[45] Date of Patent: May 4, 1993

[54] METHOD AND APPARATUS FOR DISPENSING HIGH VISCOSITY FLUID MATERIALS

[75] Inventors: George O. Porter, Amherst; Scott Hoover, Elyria; Mihail Popesco, Fairview Park, all of Ohio

[73] Assignee: Nordson Corporation, Westlake, Ohio

[21] Appl. No.: 688,905

[22] Filed: Apr. 19, 1991

[51] Int. Cl.[5] ............................................. B67D 5/06
[52] U.S. Cl. .......................................... 222/1; 222/190; 222/504
[58] Field of Search .................. 137/505.14, 505.39, 137/505.41, 613; 251/60, 63.5; 222/1, 56, 61, 190, 504, 510, 518, 396

[56] References Cited

U.S. PATENT DOCUMENTS

| | | | |
|---|---|---|---|
| 1,860,046 | 5/1932 | McCutcheon | 137/505.39 X |
| 2,660,834 | 12/1953 | MacGlashan | 137/505.39 |
| 3,690,518 | 9/1972 | Baker et al. | 222/504 |
| 3,811,601 | 5/1974 | Reighard et al. | 222/504 X |
| 3,840,158 | 10/1974 | Baker et al. | 222/504 X |
| 4,059,466 | 11/1977 | Scholl et al. | 222/251 X |
| 4,059,714 | 11/1977 | Scholl et al. | 222/146.5 X |
| 4,368,852 | 1/1983 | Sharp et al. | 239/695 |
| 4,371,096 | 2/1983 | Scholl et al. | 222/190 |
| 4,430,886 | 2/1984 | Rood | 239/71 X |
| 4,465,212 | 8/1984 | Boone | 222/504 |
| 4,535,919 | 8/1985 | Jameson | 222/190 |
| 4,579,255 | 4/1986 | Frates et al. | 222/518 X |
| 4,651,906 | 3/1987 | Hoffmann et al. | 222/504 |
| 4,679,711 | 7/1987 | Trevathan | 222/518 X |
| 4,682,710 | 7/1987 | Turner, Jr. et al. | 222/63 |
| 4,682,711 | 7/1987 | Reighard et al. | 222/75 |
| 4,711,379 | 12/1987 | Price | 222/504 |
| 4,778,631 | 10/1988 | Cobbs, Jr. et al. | 261/128 |
| 4,779,762 | 10/1988 | Klein et al. | 222/190 X |
| 4,801,051 | 1/1989 | Lewis et al. | 222/504 X |
| 4,850,514 | 7/1989 | Scholl et al. | 222/504 X |
| 4,852,773 | 8/1989 | Standlick et al. | 222/504 |
| 4,922,852 | 5/1990 | Price | 222/55 X |
| 4,962,871 | 10/1990 | Reeves | 222/504 |

Primary Examiner—Andres Kashnikow
Assistant Examiner—Kenneth Bomberg
Attorney, Agent, or Firm—Wood, Herron & Evans

[57] ABSTRACT

A method and apparatus for dispensing a solution of highly viscous polymeric material and gas includes a dispenser connected to a pressure regulator which is adapted to connect to a source of a pressurized polymer/gas solution. Minimal pressure drop due to line losses occurs in the course of transmitting the solution from the pressure regulator into the dispenser because of their close proximity, and the solution is maintained under controlled pressure throughout passage to the discharge outlet of a nozzle carried by the dispenser so that the gas is maintained in solution in the polymeric material until it is discharged from the nozzle to atmosphere. The flow rate of solution through the dispenser is variable by operation of adjustable valve structure associated with the dispenser and/or by operation of the pressure regulator.

26 Claims, 4 Drawing Sheets

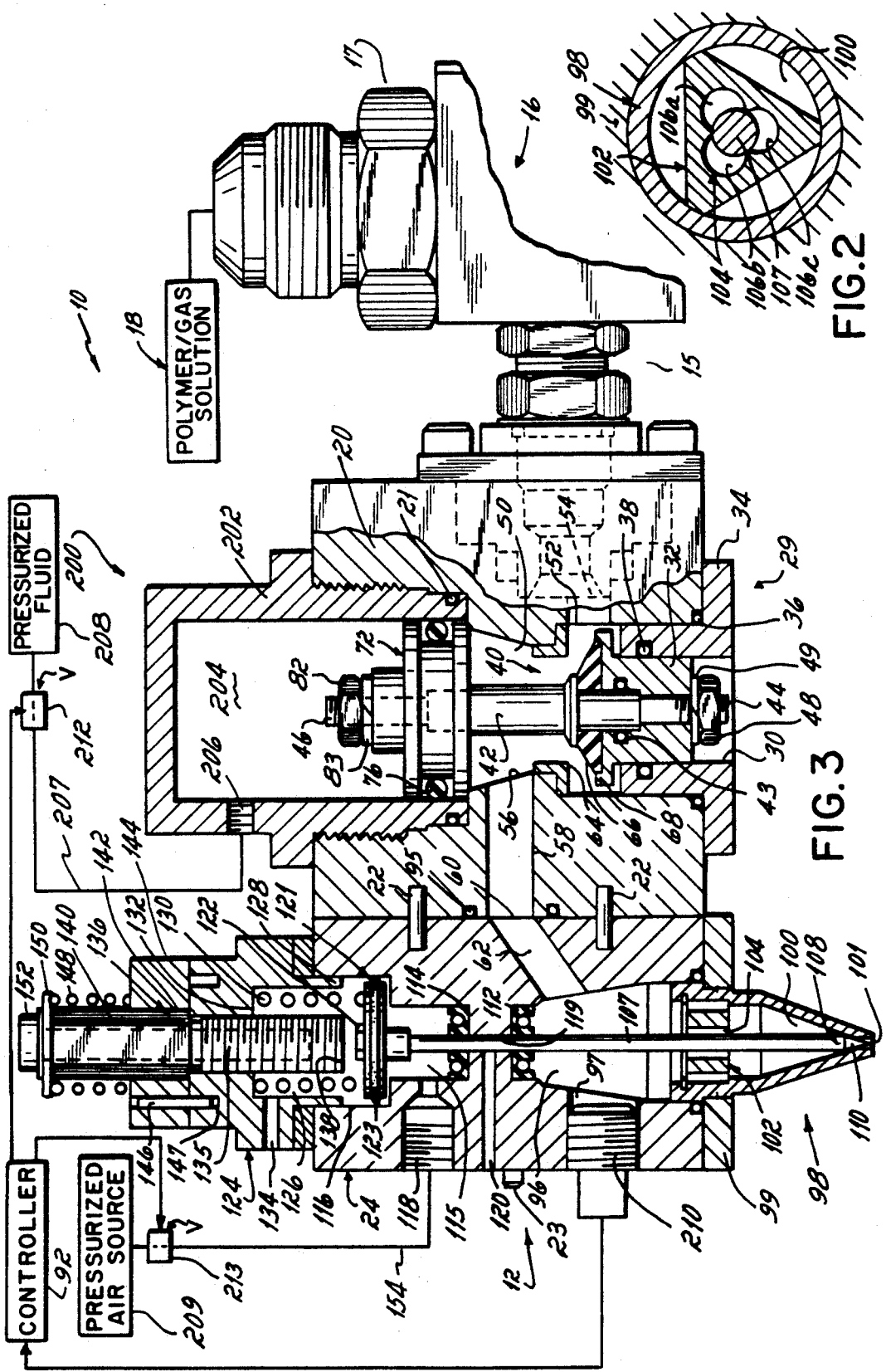

METHOD AND APPARATUS FOR DISPENSING HIGH VISCOSITY FLUID MATERIALS

FIELD OF THE INVENTION

This invention relates to dispensing apparatus, and, more particularly, to an apparatus for dispensing a mixture of highly viscous polymeric material and a gas, such as air, to form a polymer foam on a substrate while avoiding the production of pressure surges and pressure drops when the apparatus is operated intermittently.

BACKGROUND OF THE INVENTION

The assignee of this invention has pioneered the development and application of methods and apparatus for foaming polymeric materials such as hot melt thermoplastic adhesives, polymeric coatings, paints and other thermoplastic and/or thermosetting materials. In the case of hot melt adhesives, for example, it has been discovered that the strength of an adhesive bond achieved with a given volume of selected hot melt adhesive can be appreciably improved if the adhesive is applied as a foam rather than as a conventional non-foamed adhesive.

As disclosed, for example, in U.S. Pat. Nos. 4,059,466 and 4,059,714 to Scholl et al, initial attempts at "foaming" polymeric materials involved the mixture of hot melt thermoplastic adhesive and a blowing agent wherein a polymer/gas adhesive solution is formed and transmitted under pressure to and through a dispenser. Upon emerging from the nozzle of the dispenser into atmospheric pressure, the gas evolves from the solution in the form of small bubbles causing the adhesive to expand volumetrically. The resultant adhesive in an uncompressed state sets up as a homogeneous solid foam having gas cells substantially evenly distributed throughout the adhesive.

This technology has been extended to polymeric materials having a much higher viscosity than hot melt thermoplastic adhesives, as disclosed in U.S. Pat. No. 4,778,631 to Cobbs, Jr., which is owned by the assignee of this invention. Whereas hot melt adhesives have a viscosity typically in the range of about 2,200 cps to 20,000–35,000 cps, "high" viscosity polymeric material such as thermoset materials used as adhesives, seals and gasketing material have viscosities in the range of about 50,000 cps to about 1,000,000 cps. As disclosed in the U.S. Pat. No. 4,778,631 to Cobbs, Jr. et al, in order to form a solution of "high" viscosity polymeric material and gas, a low energy input disc mixer is employed to force the gas into solution with the polymeric material. When the solution is released to atmosphere, a homogeneous foam is formed wherein the gas is released from solution and becomes entrapped in the polymer.

It has been found that a number of practical problems are created in the application of high viscosity, foamed polymeric materials in a production environment. Because of the extremely high viscosity of such polymeric materials, dispensing systems must "dead end" at the dispenser, i.e., the material cannot be efficiently recirculated from the source, through the dispenser and back to the source because of the excessive amount of energy needed to move such material and the bulk of the conduit required. If the high viscosity material is dead-ended or stopped within the dispenser, unsatisfactory variations in the amount of material discharged from the dispenser can occur, particularly when the dispenser is operated intermittently. Each opening and closing of the valves associated with the dispenser to obtain intermittent discharge of material can result in pump surges and pressure fluctuations which, in turn, cause wide flow variations of the polymeric material discharged from the dispensers. Excessive application of material can result in a messy or sloppy appearance where the polymer is applied as a seam sealer, and/or can result in the formation of a gasket having an uneven profile. Wide pressure fluctuations also can result in the premature formation of foam within the dispenser if the pressure falls below the level required to maintain the gas in solution, or the formation of poor quality foam if the pressure is too high within the dispenser and the gas is not readily permitted to leave solution.

The problems associated with intermittent application of high viscosity polymeric materials have been addressed to some extent in the prior art. For example, in U.S. Pat. No. 4,922,852 to Price, owned by the assignee of this invention, a dispenser is provided with a servo-actuator including an electro-pneumatic servo-valve which operates a double-acting piston actuator for a variable fluid metering valve. A pressure sensor at the nozzle of the dispenser generates a pressure signal which is correlated to the instantaneous flow rate of the dispensed fluid to obtain precise control of the amount of fluid dispensed even when the dispenser is operated intermittently. While the system disclosed in the U.S. Pat. No. 4,922,852 operates effectively, it is relatively expensive because of the rather sophisticated control systems which are required to monitor and control the fluid flow.

Another problem with many systems of the type disclosed in the U.S. Pat. No. 4,922,852 is that they are not designed for use with "foamed" polymeric materials, i.e., a pressurized polymer/gas solution such as a highly viscous polymeric adhesive, sealant and/or gasketing material in which gas is contained in solution with such material. In order for a system to effectively dispense foamed polymeric material, the gas must remain in solution throughout its passage to and through the dispenser. The apparatus disclosed in U.S. Pat. No. 4,922,852, for example, employs a dispenser having a relatively large cavity between the discharge outlet of the dispenser and its flow control valve within which the adhesive could be permitted to foam when the valve is closed creating a potential problem of drool or leakage of the foamed adhesive out of the cavity. Apparatus of this type may be unacceptable for use in connection with pressurized solutions of polymeric material and gas.

It has been observed that another practical problem often occurs in the course of dispensing highly viscoelastic polymeric materials such as adhesives, sealants and gasketing materials, particularly in automated applications wherein a robot arm or the like manipulates a dispenser in a non-linear flow path with respect to a substrate. In the application of a gasketing material onto a substrate, for example, a dispenser typically discharges material at a constant flow rate while the robot arm moves in an essentially straight path with respect to the substrate. When the dispenser is moved in a non-linear path, however, such as around a corner, the highly viscoelastic polymeric material tends to be pulled away from the corner if the dispenser continues to operate at the same flow rate. There has therefore been a need to provide automatically manipulated dispensers with the capability of varying the flow rate at which polymeric material is dispensed therefrom, without substantially adding to the expense of the dispenser and/or the controllers associated with the dispenser.

SUMMARY OF THE INVENTION

It is therefore among the objectives of this invention to provide an apparatus for dispensing a solution of highly viscous polymeric material and gas, which provides for intermittent operation without wide pressure fluctuations in the material applied to the substrate, which maintains the gas in solution with the polymeric material until discharged to atmosphere, which provides for variation in the flow rate of the solution, and, which is relatively inexpensive to construct and maintain.

These objectives are accomplished in an apparatus for dispensing a solution of highly viscous polymeric material and a gas which comprises a dispenser, a pressure regulator, and, optionally, a swivel mount, all of which are interconnected to one another. The pressure regulator is adapted to connect to a source of a pressurized polymer/gas solution either directly or through the swivel mount. The solution is transmitted through the pressure regulator directly into a fluid passageway formed in the dispenser body of the dispenser. Minimal pressure drop due to line losses occurs because of the close proximity of the pressure regulator and dispenser, and the solution is maintained under high pressure within the fluid passageway in the dispenser to the discharge outlet of a nozzle carried by the dispenser. This maintains the gas in solution in the polymeric material within the dispenser body until it is discharged from the nozzle to atmosphere at which time the gas evolves from solution to form a homogeneous foam having gas cells substantially evenly distributed throughout the polymeric material.

One important aspect of this invention is predicated upon the concept of minimizing the duration and extent of pressure fluctuations in the polymer/gas solution, particularly when the dispenser is operated intermittently. This is accomplished in the apparatus of this invention by mounting the pressure regulator and dispenser in such close proximity to one another that little or no line losses occur as the solution is transmitted from the pressure regulator to the discharge outlet of the nozzle in the dispenser. As a result, the transition from static pressure to dynamic pressure, e.g., when the dispenser is intermittently operated, occurs very quickly and the pressure drop of the fluid material within the dispenser is minimized Moreover, the dynamic pressure is maintained at a substantially constant level by the pressure regulator throughout operation of the dispenser. It has been found that such construction and operation of the apparatus of this invention is particularly advantageous in dispensing highly viscous materials, and that large line losses and unacceptable application characteristics of the foam material are obtained if the pressure regulator is eliminated or positioned at a remote location from the dispenser.

In the presently preferred embodiment, the dispenser and pressure regulator are mounted in close proximity to one another, and the solution is transmitted from the outlet of the pressure regulator substantially directly into the inlet of the fluid passageway in the dispenser. The pressure regulator maintains the polymer/gas solution at the desired application pressure, whether the dispenser is operated continuously or intermittently, by a piston associated with the pressure regulator which is movable with respect to a seat formed in a cavity through which the solution is directed before entering the dispenser body. Movement of the piston is controlled by a spring, or, alternatively, pressurized fluid, such that when the discharge outlet of the fluid passageway in the dispenser is closed, the solution located in the dispenser downstream from the pressure regulator is maintained at the desired application pressure, whereas the solution upstream from the pressure regulator, i.e., between the pressure regulator and source of polymer/gas solution, is maintained at higher pressure. When the discharge outlet of the nozzle in the dispenser is opened, a pressure surge is avoided because the solution within the dispenser, downstream from the pressure regulator, has been maintained at the appropriate application pressure. As the pressure downstream from the regulator is relieved, the piston of the regulator opens allowing solution upstream from the pressure regulator to flow therethrough. The pressure of such solution is reduced to the appropriate application pressure, by operation of the regulator piston, as it passes through the pressure regulator and enters the dispenser. Further, because of the close proximity between the pressure regulator and dispenser, minimal pressure drop occurs due to line losses as the solution upstream from the pressure regulator flows into the dispenser body and through the dispenser nozzle.

It has been found that the above-described construction, in which the pressure of the solution is relatively accurately controlled, is an important factor in obtaining foam having the desired application characteristics. Preferably, the pressure of the solution prior to discharge from the dispenser should be slightly above the pressure at which the gas leaves solution. If the pressure of the solution is too high, the resulting bead of adhesive or other material exhibits poor foam quality. On the other hand, if the pressure of the solution is too low, the gas may leave solution and begin to form a foam within the dispenser which also produces an unacceptable bead. It is therefore advantageous, and an important feature of this invention, to provide for relatively accurate control of the solution pressure, particularly when the dispenser is operated intermittently.

In another aspect of this invention, the dispenser is constructed to maintain the gas in solution in the liquid polymeric material before the solution is emitted from the discharge outlet in the fluid passageway of the dispenser body. Preferably, the fluid passageway in the dispenser carries a needle valve having a valve tip which seats at the discharge outlet to the fluid passageway. The polymer/gas solution is conveyed under pressure through the fluid passageway in the dispenser body and into the nozzle to a location immediately adjacent the discharge outlet of the nozzle where the valve tip seats. As a result, the gas remains in solution in the polymeric material within the dispenser and does not evolve from solution to form a polymer foam until the needle valve is moved to an open position with respect to the discharge outlet and the solution is emitted to atmosphere.

In another aspect of this invention, it has been found desirable in certain applications to provide for variation in the flow of solution from the dispenser. In one presently preferred embodiment, the dispenser is provided with an adjustable stop which engages the needle valve as it moves to an open, unseated position relative to the discharge outlet in the nozzle of the dispenser. The stop can be adjusted manually, at the beginning of a production run, to vary the extent of axial movement of the needle valve, and, hence, the flow rate of solution through the nozzle.

In an alternative embodiment, adjustment of the flow rate of solution is obtained during a production run with a dispenser having at least a two-stage actuator. In this embodiment, a flow control module and a dispenser body are interconnected, one on top of the other, to actuate a needle valve carried in the dispenser body. The needle valve has one end formed with a valve tip positioned at the discharge outlet of nozzle carried by the dispenser body, and an opposite end carrying a piston. The piston engages a return spring which normally holds the valve tip in a closed position with respect to the discharge outlet in the nozzle. In response to the application of pressurized air on the side of the piston opposite the spring, the needle valve is moved axially upwardly to a first or partially opened position with respect to the discharge outlet of the nozzle.

In the course of moving axially upwardly, the piston connected to the needle valve contacts the lower end of a plunger which is carried by the flow control module in axial alignment with the needle valve. The opposite end of the plunger is connected to a piston which engages a return spring. This return spring is effective to restrict the axial movement of the plunger, and exerts a spring force which acts in the same direction as the spring force exerted by the return spring associated with the needle valve. The spring force exerted by the upper return spring associated with the plunger, when combined with the spring force of the lower return spring, is sufficient to restrict the upward axial movement of the needle valve beyond the point where the piston of the lower needle valve contacts the plunger of the flow control module. As a result, the needle valve and its valve tip are moved to a predetermined first or partially open position relative to the discharge outlet of the nozzle in dispenser body in response to the application of pressurized air beneath the piston of the needle valve.

In order to move the needle valve to a more completely open or second position, pressurized air is introduced beneath the piston mounted to the plunger of the flow control module. The combined force of the pressurized air exerted on the pistons of the needle valve and plunger is sufficient to overcome the combined force exerted by the return springs against such pistons in the opposite direction, thus allowing the needle valve to move upwardly away from the discharge outlet of the nozzle in the dispenser body to a second, more fully open position.

In the presently preferred embodiment, the dispenser body includes a nozzle having an elongated bore within which an elongated valve tip of the needle valve is axially movable. The elongated valve tip has an outside diameter which is somewhat smaller than the diameter of the elongated bore so that the valve tip acts as a variable flow restrictor to control the flow of solution through the elongated bore. The elongated valve tip is movable to a first position with respect to the discharge outlet of the nozzle which allows flow of solution therethrough at a first flow rate, and then the valve tip moves axially further from the discharge outlet of the nozzle with the needle valve in the second position, thus permitting a higher flow rate of solution therethrough.

The two-stage motion of the needle valve provides for a variation in the flow rate of solution emitted from the discharge outlet of the dispenser body. This is accomplished without a sophisticated, expensive controller system, and can accommodate applications such as the manipulation of the dispenser around a corner or other non-linear flow paths.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 2 is an enlarged cross sectional view taken on line 2—2 of FIG. 1 illustrating the needle valve guide of the dispenser;

FIG. 3 is a view similar to FIG. 1 except with an alternative type of pressure regulator;

DETAILED DESCRIPTION OF THE INVENTION

Figure 1:
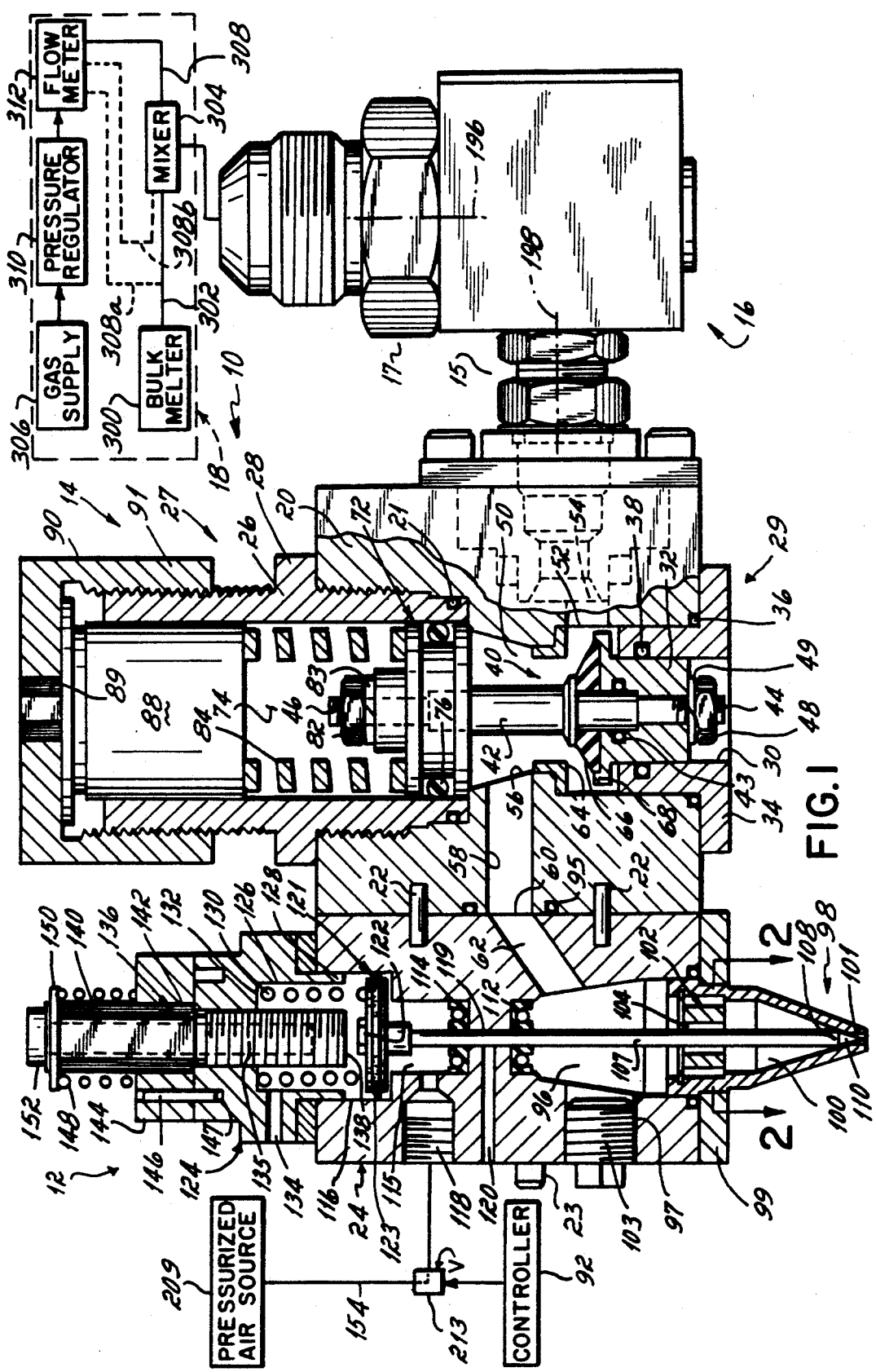
FIG. 1 is a schematic view in partial cross section of the apparatus of this invention including a dispenser, pressure regulator and swivel mount, and a system for supplying a liquid/gas solution thereto.

Referring now to FIG. 1, the dispensing apparatus 10 of this invention includes a dispenser 12, a pressure regulator 14, and, in the presently preferred embodiment, a swivel mechanism 16 adapted to connect to a source of polymer/gas solution. A method and apparatus of producing a solution of polymeric material and gas in preparation for foaming by the dispensing apparatus 10 of this invention is disclosed in U.S. Pat. No. 4,778,631 to Cobbs, Jr. et al, owned by the assignee of this invention, the disclosure of which is incorporated by reference in its entirety herein.

One preferred embodiment of the apparatus disclosed in U.S. Pat. No. 4,778,631 to Cobbs, Jr. et al is schematically illustrated in FIG. 1 and identified generally with the reference number 18. The identical apparatus is employed in other embodiments of this invention, but for ease of illustration the apparatus is shown schematically in a single block labeled "polymer/gas solution" 18 in FIGS. 3 and 4.

As shown in FIG. 1, apparatus 18 employs a bulk source of polymeric material such as a bulk melter 300 containing heating means for liquifying a solid or semi-solid polymer material and pumping it from the tank. An example of a bulk melter is shown in U.S. Pat. No. 4,073,409, assigned to the assignee of this invention, the disclosure of which is incorporated by reference in its entirety herein. The pump associated with the bulk melter 300 is a cartridge-type gear pump, however, any pump capable of providing sufficient pressure to pump the material from the bulk melter 300 is suitable.

The material to be foamed is conveyed through line 302, which may be a hose capable of conveying heated material under pressure, to the upstream end of a disc mixer 304 where it is injected into the mixer 304. The foaming gas is supplied to the disc mixer 304 from a pressurized gas supply 306 through a gas line 308. A pressure regulator 310 and flow meter 312 are connected in line 308 and permit control of gas pressure and flow rate, respectively, to the mixer 304. As schematically illustrated in FIG. 1, the gas may be supplied to the system through several alternative paths. One is to fill the mixer 304 only partially full with polymer material and to fill the head space over such polymer material wit gas from line 308 (shown in solid lines) to a desired pressure whereupon in the mixer 304 the polymeric material to be foamed entrains the gas from the head space on operation of the mixer 304 to form the polymer gas solution. An alternative gas flow path 308a (shown in dotted lines) is to meter gas bubbles into the line 302 supplying the polymeric material to the mixer 304 so that the gas and polymer enter the mixer 304 together and completely fill it. Another alternative 308b (also shown in dotted lines) is to provide a porous end plate in the upstream end of the mixer 304 and to supply gas bubbles through the porous end plate to the mixer 304, which is completely filled with polymer, such that the bubbles are forced into solution with the polymer. Any of these alternative methods may be used depending upon the particular application, however, for purposes of illustration, supplying the foaming gas to the head space in the mixer 304 through line 308 is illustrated as one embodiment.

As described in detail in U.S. Pat. No. 4,778,631, and as used herein, the term "polymer/gas" solution is meant to refer to a combination of thermoplastic or thermosetting polymeric material and gases such as air, nitrogen, oxygen, carbon dioxide and a variety of other gases or mixtures thereof. The term "solution" is used to describe a pressurized mixture of liquid polymer and dissolved gas which, when subjected to atmospheric pressure, forms a foam in which the gas evolves from solution in the form of small bubbles which enlarge and cause the polymer material to expand volumetrically. As used in the specification and claims, the "solution" of polymeric material and gas is intended to define and encompass the broader generic definition of solution which is a homogeneous mixture of a gas and molten or liquid polymer, whether or not the gas molecules are in fact dissolved or dispersed among the polymer molecules.

The dispensing apparatus 10 of this invention is particularly adapted to dispense foamed thermoplastic and thermosetting polymeric materials having a relatively high viscosity, i.e., in the range of about 50,000 to 1,000,000 cps and above, which are suitable for use as sealants, adhesives, gasketing materials and the like. Examples of these materials are given in U.S. Pat. No. 4,778,631.

PRESSURE REGULATORS OF FIGS. 1 AND 3

Referring to FIGS. 1 and 2, the pressure regulator 14 of apparatus 10 includes a mounting block 20 located by pins 22 and secured by screws 23 to the dispenser body 24 of dispenser 12. The upper portion 27 of pressure regulator 14 comprises a regulator body 26 which is threaded into a bore formed in the mounting block 20, and sealed by an O-ring 21 therein, such that an annular flange 28 carried by the regulator body 26 rests against the top surface of the mounting block 20. The lower portion of the pressure regulator 14 includes a base 29 formed with a throughbore 30 which slidably receives a valve guide 32. The lowermost end of base 29 is formed with an annular flange 34 which is sealed by an O-ring 36 to the lower face of mounting block 20. A second O-ring 38 is interposed between the base 29 and the valve guide 32. As used herein, the term "upper" or "top" is used to refer to the upper portion of the apparatus herein as it is depicted in FIG. 1, and the terms "lower" or "bottom" refer to the opposite direction.

In the presently preferred embodiment, the valve guide 32 mounts one end of a regulator valve 40 having a stepped shaft 42 formed with a lower threaded end 44 and an upper threaded end 46. The stepped shaft 42 is held in sealing engagement with the valve guide 32 by an O-ring 43. The lower threaded end 44 of stepped shaft 42 receives a nut 48 and lock washer 49 which mount the stepped shaft 42 to the valve guide 32. The stepped shaft 42 is carried within a cavity 50 formed in the mounting block 20 having an inlet 52 communicating with the outlet 54 of the swivel mechanism 16, and an outlet 56 which is connected by a passageway 58 to the inlet 60 of a fluid passageway 62 formed in the dispenser body 24 of dispenser 12 as discussed below.

Preferably, the mounting block 20 is formed with a valve seat 64 mounted within the cavity 50 in a position to engage a valve plate 66 fixed to the stepped shaft 42 of valve 40. As shown in FIG. 1, this valve plate 66 is carried in an annular flange 68 formed in the valve guide 32 so that the valve 40 and valve guide 32 move axially as a unit.

The upper portion of the stepped shaft 42 of valve 40 is connected to a piston 72 axially movable within a cavity 74 formed in the upper portion 27 of regulator 14. An O-ring 76 is carried in a seat formed in the piston 72 which sealingly engages the wall of regulator body 26 formed by the cavity 74. The stepped shaft 42 is fixedly mounted to the piston 72 by a nut 82 and lock washer 83 carried on the upper threaded end of stepped shaft 42.

As viewed in FIG. 1, a regulator spring 84 is carried within the cavity 74 of regulator body 26 between the top surface of piston 72 and a retainer 88 slidably received with the cavity 74 of regulator body 26. The top of retainer 88 rests against the bottom of a cap 90 which is formed with a non-circular-shaped recess 89 adapted to receive an adjusting tool (not shown). The cap 90 is formed with an internally threaded flange 91 which engages threads on the outer surface of the upper portion of regulator body 26. The cap 90 is thus axially adjustable along the regulator body 26 to move the retainer 88 toward or away from the piston 72, which, in turn, varies the spring force exerted by the regulator spring 84 against the piston 72.

As described in more detail below, pressurized polymer/gas solution is introduced into the cavity 50 of mounting block 20 and flows against the lowermost surface of the piston 72 causing it to move axially within the cavity 74 of regulator body 26 against the force exerted by the regulator spring 84. In response to the movement of piston 72, the valve plate 66 is moved axially with respect to the valve seat 64 to variably restrict the flow of solution through cavity 50 into passageway 58. In the embodiment of FIG. 1, axial movement of the piston 72 is controlled by the spring force of the regulator spring 84 which, in turn, controls the axial movement of the valve 42 and valve plate 66.

In an alternative embodiment illustrated in FIG. 3, a modified pressure regulator 200 is employed having a regulator body 202 similar to that of pressure regulator 14 except the regulator spring 84, retainer 88 and cap 90 of regulator 14 are eliminated. In this embodiment, the regulator body 202 has a hollow cavity 204 filled with pressurized fluid introduced through a port 206 connected by a line 207 to a pressurized fluid source 208.

The pressurized fluid within the closed cavity 204 exerts a force on the piston 72, but unlike the force applied by regulator spring 84, the force of the pressurized fluid can be variably controlled by a controller 92 which operates a valve 212 mounted in the line 207 between the pressurized fluid source 208 and cavity 204. As described in more detail below, the controller 92 accepts signals from a pressure transducer 210 mounted to the dispenser body 24 of dispenser 12 which are compared to a predetermined setpoint in the controller 92. An output from the controller 92 operates the valve 212 to vary the pressure of the fluid within cavity 204, and thus the force exerted against piston 72, as desired. The other structure of apparatus 10 illustrated in FIG. 3 is identical to that in FIG. 1, and is given the same reference numbers.

DISPENSER OF FIGS. 1-3

As mentioned above, the mounting block 20 which carries pressure regulator 14 is directly mounted to the dispenser body 24 of dispenser 12. An important aspect of this invention is that the pressure regulators 14 and 200, and dispenser 12, are mounted in such close proximity that pressure losses are substantially eliminated as the highly viscous polymer/gas solution is transmitted to the dispenser 12 for discharge onto a substrate.

In one presently preferred embodiment, the fluid passageway 62 formed in dispenser body 24 has an inlet 60 which is directly connected to the outlet passageway 58 of mounting block 20. This connection is sealed by an O-ring 95 to provide a face seal between the mounting block 20 and dispenser body 24. The fluid passageway 62 is connected to a discharge cavity 96 formed near the base of dispenser body 24 which is intersected by an internally threaded port 97. In the embodiment of FIG. 1, the port 97 is closed by a plug 103. The port 97 mounts the pressure transducer 210 in the embodiment of FIG. 3, as mentioned above.

The cavity 96 in dispenser body 24 communicates with a nozzle 98 mounted to the dispenser body 24 by a plate 99 located at the bottom surface of dispenser body 24. The nozzle 98 is formed with a discharge passageway 100 which tapers radially inwardly from the cavity 96 to a discharge outlet 101 at the lowermost end of nozzle 98. As best seen in FIG. 2, the discharge passageway 100 of nozzle 98 carries a triangular-shaped valve guide 102 having a central opening 104 defined by three lobes or bores 106a-c which are spaced approximately 120° from one another. The central opening 104 receives and guides the lower end of valve stem 107 of a needle valve 108 which includes a valve tip 110 located at the discharge outlet 101 of the discharge passageway 100 in nozzle 98. The upper end of needle valve stem 107 of valve 108 is guided by a first seal 112 mounted at the top of discharge cavity 96, and a second seal 114 mounted within an air cavity 115 defined by a stepped bore 116 formed in the top of dispenser body 24. The air cavity 115 is intersected by an air inlet port 118. An air or sealant weep port 120 is formed in the dispenser body 24 beneath the upper or second seal 114 of air cavity 115. This port 120 intersects a bore 119 which receives that portion of the stem 107 of needle valve 108 extending between the discharge cavity 96 and air cavity 115. A piston 121 is mounted by a screw 122 to the uppermost end of needle valve 108 which is axially movable within the air cavity 115. Preferably, the piston 116 carries an annular seal 123 which engages the wall of dispenser body 24 formed by air cavity 115 to provide a dynamic seal therebetween.

Referring to the top portion of FIG. adjustment structure is provided to control the extent of axial movement of needle valve 108 which, in turn, controls the flow of polymer/gas solution through the discharge outlet 101 of nozzle 98. In the presently preferred embodiment, this adjustment structure comprises a collar 124 mounted by fasteners (not shown) to the top of dispenser body 24. The collar 124 is formed with a bore 126 which defines an annular projection 128 insertable within the upper portion of the stepped bore 116 in dispenser body 24. A return spring 130 is carried within the bore 116 which extends between the top of piston 121 and a shoulder 132 formed at the top end of bore 126. A vent passage 134 is formed in collar 124 which intersects bore 126.

The upper end of stepped bore 126 is threaded to receive the threaded portion 135 of an adjustment shaft 136 such that the lowermost end 138 of shaft 136 is axially aligned with the screw 122 of piston 121. See FIG. 1. The top portion of the adjustment shaft 136 is formed with a non-circular portion 140, e.g., hex-shaped, which is received within a mating bore 142 formed in a knurled ring 144. This ring 144 rests atop the collar 124 and is held in a rotatably fixed position with respect to the collar 124 by a pin 146 extending therebetween. The pin 146 is fixedly mounted to the ring 144 and is sized to engage one or more bores 147 formed in the collar 124, two of which are shown in FIG. 1. Because the ring 144 and adjustment shaft 136 are interconnected along the non-circular portion 140 of shaft 136, the shaft 136 is also held in a rotatably fixed position when the ring 144 is mounted to the collar 124. In the presently preferred embodiment, a spring 148 is interposed between the top of ring 144 and a washer 150 mounted at the top of adjustment shaft 136 by a snap ring 152 to retain the ring 144 in engagement with collar 124.

Axial movement of the needle valve 108, and the adjustment of the extent of such axial movement, is obtained as follows. The needle valve 108 is normally maintained in a closed position by the return spring 130. In the closed position, the valve tip 110 of needle valve 108 seats within the discharge outlet 101 of nozzle 98. In order to move the needle valve 108 to an open position, pressurized air is introduced into the air cavity 115 through port 118 by a line 154 connected to a source of pressurized air 209. The flow of pressurized air through line 154 is preferably controlled by a three-way valve 213 mounted therein, which is operated by the same controller 92 described above in connection with pressure regulator 14. The pressurized air forces the piston 121, and, in turn, the needle valve 108, upwardly as viewed in FIG. 1. This unseats the valve tip 110 from the discharge outlet 101 of nozzle 98 allowing the flow of polymer/gas solution therethrough. Air is subsequently exhausted from the cavity 115 through the three-way valve 213.

As illustrated in FIG. 1, the extent of upward, axial movement of the piston 121 and needle valve 108 is dependent upon the position of adjustment shaft 136 with respect to the screw 122 connected to piston 121 The piston 121 is axially movable in an upward direction until the screw 122 contacts the lowermost end 138 of adjustment shaft 136. In order to vary the extent of axial movement of piston 121 and needle valve 108, the adjustment shaft 136 is threaded axially upwardly or downwardly within the stepped bore 126 of collar 124, as desired. This is accomplished as follows. Initially, the ring 144 is pulled upwardly along the non-circular portion 140 of shaft 136, against the force of spring 148, so that the pin 146 connected to ring 144 disengages the bore 147 in collar 124. With the ring 144 and pin 146 disengaged from collar 124, the adjustment shaft 136 can be rotated in either direction to move the lowermost end 138 of its threaded portion 135 either toward or away from the adjustment screw 122 of piston 121. Once the desired adjustment has been obtained, the pin 146 is realigned with one of the bores 147 in collar 124 allowing the spring 148 to force the ring 144 back onto the top surface of collar 124. Adjustment of the extent of axial movement of needle valve 108 thus permits adjustment of the flow rate of polymer/gas solution through the discharge outlet 101 of nozzle 98.

ALTERNATIVE DISPENSER EMBODIMENT OF FIG. 4-5C

In the embodiments illustrated in FIGS. 1-3, adjustment of the flow rate of polymer/gas solution is obtained by adjusting the extent of axial movement of the needle valve 108. As described above, such adjustment must be made manually by varying the axial position of the adjustment shaft 136 with respect to the piston 121 carried by needle valve 108. While manual adjustment is suitable for some types of applications, it has been found advantageous in other applications to vary the flow rate of polymer/gas solution in the course of a production run.

Figure 4:
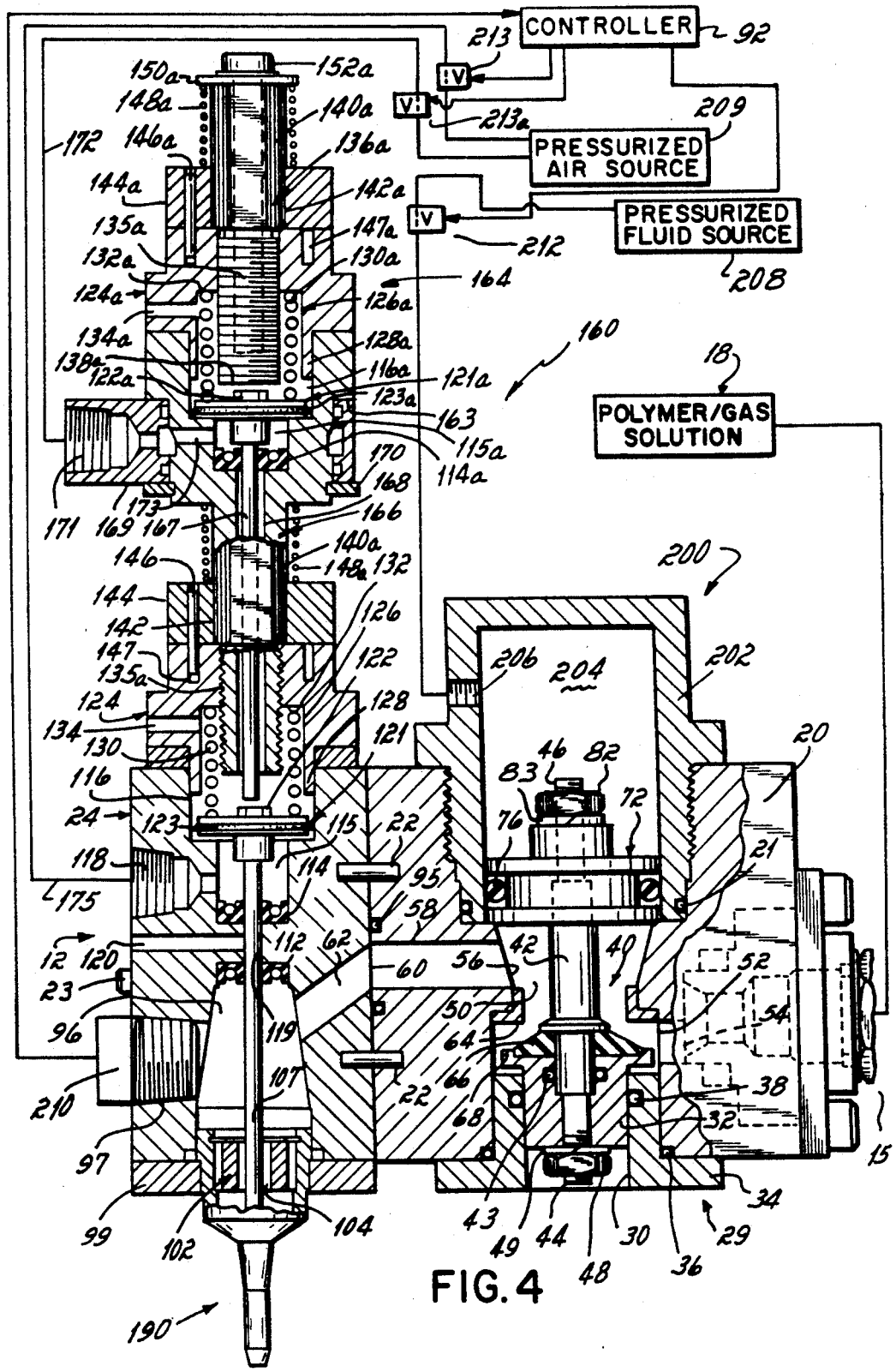
FIG. 4 is an elevational view in partial cross section of an alternative embodiment of the dispenser of this invention having a two-stage flow rate capability.
Figure 5C:
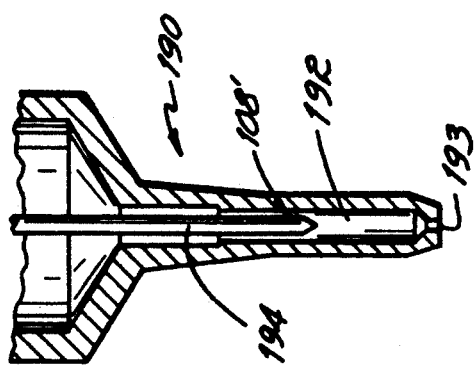
FIGS. 5A–5C are enlarged, schematic views of a preferred embodiment of the nozzle employed with the dispenser of FIG. 3 in the closed, partially open and fully open positions.

With reference to FIGS. 4-5C, an alternative embodiment of an apparatus 160 in accordance with this invention is illustrated which is capable of varying the flow rate of polymer/gas solution between a first flow rate and a second flow rate during operation. The apparatus 160 generally comprises a dispenser 12 as described above except for the modifications noted below, and a flow control module 164 which is constructed with much of the same structure as dispenser 12. For purposes of the present discussion, the structure of the flow control module 164 which is common to that of dispenser 12 is given the same reference number in FIG. 4 as in FIG. 1, with the addition of an "a" to the reference numbers in FIG. 4. The apparatus 160 also generally includes a pressure regulator 200 of the type described above in connection with FIG. 3, and the same reference numbers are used in FIG. 4 for structure common to that in FIG. 3. It should be understood that the spring-operated pressure regulator 14 of FIG. 1 could also be employed with the apparatus 160, if desired.

As viewed in FIG. 4, the upper flow control module 164 is mounted atop the dispenser 12 by a somewhat modified adjustment shaft 166, compared to the adjustment shaft 136 of FIG. 1. Preferably, the adjustment shaft 166 is fixedly mounted by brazing, welding or the like to the base of the flow control module 164, or integrally formed therewith, so that a plunger 167 carried by flow control module 164 extends into a throughbore 168 formed in adjustment shaft 166 to a location immediately above the piston 121 of dispenser 12. This plunger 167 carries an upper piston 121a within the air cavity 115a formed in flow control module 164.

The axial position of adjustment shaft 166, and, in turn, plunger 167, is adjustable in the same manner as described above in connection with adjustment shaft 136 of FIG. 1 except that rotation of adjustment shaft 166 relative to the collar 124 of dispenser 12 is obtained by rotating the entire flow control module 164 because shaft 166 is fixedly mounted thereto. Such manual rotation of the flow control module 164 and shaft 166 results in a variation of the axial space between the piston 121 of dispenser 12 and the plunger 167 of flow control module 164. Accordingly, the apparatus 160 is provided with the same "manual" or initial flow rate adjustment capability as the dispenser 12 of FIG. 1. That is, manual variation of the initial position of the plunger 167 relative to the piston 121 of dispenser 12 controls the extent of axial motion of its needle valve in the identical manner as with adjustment shaft 136 described above.

Figure 5B:
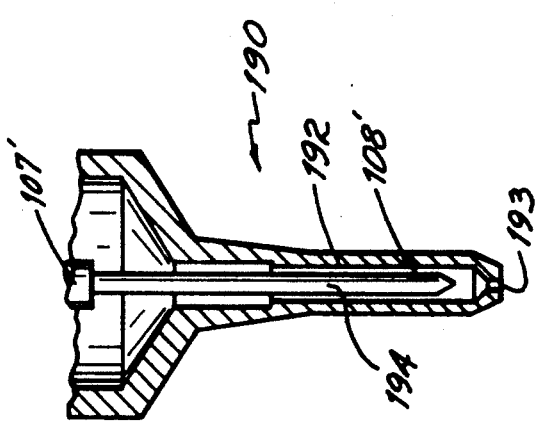
Figure 5A:
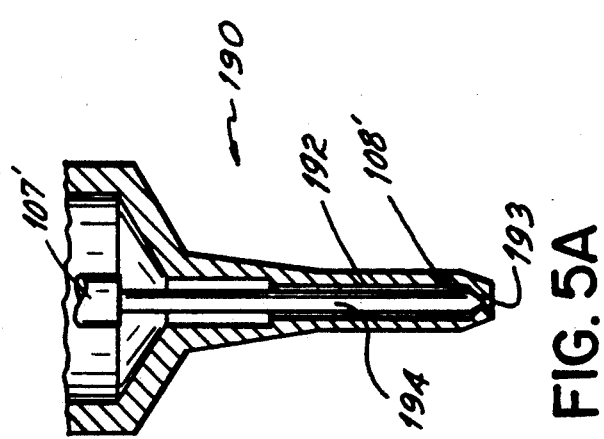

The apparatus 160 of this embodiment is preferably used in combination with a modified needle valve 108' and associated nozzle 190 of the type illustrated in FIGS. 5A-5C. As shown in FIGS. 5A-5C, the nozzle 190 is formed with an elongated discharge passageway 192 having a discharge outlet 193. This discharge passageway 192 receives an elongated, uniform diameter valve tip 194 connected to the stem 107' of needle valve 108'. As viewed in FIGS. 5A-5C, the outside diameter of valve tip 194 is somewhat less than the inside diameter of discharge passageway 192, thus creating a relatively narrow, annular flow path therebetween.

Another minor modification in the embodiment of FIG. 4, compared to that of FIGS. 1 and 3, is that the flow control module 164 is formed with a seat 163 which receives a fitting 169 held therein by a snap ring 170. The fitting 169 has a port 171 which is connected by a line 172 to the source 209 of pressurized air, and which communicates with a bore 173 formed in flow control module 164 leading to the air cavity 115a therein.

The apparatus 160 of this embodiment is effective to discharge solution from the dispenser 12 at two different flow rates by moving the modified needle valve 108' between a closed position, a first open position and a second open position. For example, in order to move the needle valve 108' of the nozzle 190 of dispenser 12 to a first, partially open position, pressurized air is introduced into the air cavity 115 of dispenser 12 through a line 175 so that its piston 121 is moved axially upwardly against the force of the return spring 130 in the dispenser 12. When the piston 121 of dispenser 12 moves axially upwardly a predetermined distance, its mounting screw 122 contacts the bottom of plunger 167 of flow control module 164 and begins to act against the return spring 130a in flow control module 164. While the force exerted on the lower piston 121 by the pressurized air within the air cavity 115 of dispenser 12 is sufficient to overcome the spring force of the return spring 130, the return spring 130a of flow control module 164 which acts on the upper piston 121a carried by plunger 167 restricts further axial movement of the needle valve 108'. As a result, the needle valve 108' in the dispenser 12 is moved to a first, open position with respect to the discharge outlet 193 of nozzle 190 in response to pressurization of air cavity 115 in dispenser 12 to permit at least some flow of polymer/gas solution therethrough.

In order to move the needle valve 108' of dispenser 12 to a second, open position, which permits greater flow of solution through the nozzle 190, pressurized air is introduced from line 172 through port 171 and bore 173 into the air cavity 115a of the flow control module 164. The pressurized air within air cavity 115a forces the piston 121a and plunger 167 of flow control module 164 axially upwardly against the force of the return spring 130a. In turn, the piston 121 and needle valve 108' of dispenser 12 are permitted to move axially upwardly within dispenser 12 simultaneously with the movement of plunger 167. The needle valve 108' of dispenser 12 is therefore moved further from the discharge outlet 193 of nozzle 190 to permit an increased flow rate of polymer/gas solution therethrough.

The differential flow rates obtained through nozzle 190 result from axial movement of the needle valve 108' therein in the manner described above. The needle valve 108' functions as a variable flow restrictor within the elongated passageway 192 of nozzle 190 which permits a greater or lesser flow of polymer/gas solution therethrough depending upon the position of needle valve 108' with respect to the discharge outlet 193 of elongated passageway 192. In response to movement of the needle valve 108' axially upwardly, the elongated valve tip 194 moves from the closed position (FIG. 5A) to a first open position (FIG. 5B) and then to a second open position (FIG. 5C). Movement of the valve tip 194 progressively further from the discharge outlet 193 of the elongated discharge passageway 192 produces less restriction or resistance to flow of the solution through discharge passageway 192, and thus the flow rate of polymer/gas solution emitted from the discharge passageway 192 increases as the needle valve 108' moves from the first open position to the second open position.

SYSTEM OPERATION

Each of the embodiments described above, i.e., FIGS. 1 and 2, FIG. 3 and FIGS. 4-5C, include common structure for accomplishing two of the primary objectives of this invention, namely: (1) controlling the pressure of the polymer/gas solution to substantially reduce or eliminate pressure surges or spikes, and alternate periods of low pressure, when the apparatus 10 or 160 is operated intermittently, and (2) maintaining the gas in solution with the liquid polymeric material prior to discharge from the nozzles 98 or 190. The operation of such common structure of the several embodiments herein is described below with particular reference to FIG. 1, it being understood that such discussion applies equally to the embodiments of FIGS. 3-5C.

In addition, the various embodiments herein are characterized below as either being operatively adjustable or operatively non-adjustable for purposes of the present discussion. The embodiment of FIG. 1 is considered to be "operatively non-adjustable" because the axial extent of the movement of needle valve 108 of dispenser 24, and the axial movement of piston 72 of pressure regulator 14, are both manually set before operation of apparatus 10 and remain at such settings throughout a production run. The embodiments of FIGS. 3-5C, on the other hand, each have at least some degree of adjustability during operation of the apparatus by varying the operation of the dispenser and/or pressure regulator.

OPERATION OF FIG. 1

Referring to FIG. 1, the overall operation of dispenser apparatus 10 is summarized as follows. Pressurized polymer/gas solution is directed from the apparatus 18 into the swivel mechanism 16 of the presently preferred embodiment It is contemplated that the swivel mechanism 16 would be employed in applications where the apparatus 10 is automatically manipulated by a robot arm or the like (not shown). Preferably, the swivel mechanism 16 has a swivel joint 17 which permits rotational movement about an axis 196, and a second swivel joint 15 which permits rotational movement about an axis 198. The structure of swivel mechanism 16 forms no part of this invention per se and is thus not described herein, it being understood that essentially any conventional swivel mechanism 16 could be employed in the apparatus 10 of this invention.

One feature of this invention which aids in control of the pressure of the polymer/gas solution so that alternating pressure surges and pressure drops are reduced or eliminated is the comparatively short flow path provided between the pressure regulator 14 and dispenser 12. As mentioned above, the polymer/gas solution is transmitted through the swivel mechanism 16 directly into the cavity 50 of mounting block 20 mounted thereto. With the needle valve 108 of dispenser 12 in an open position, the solution passes through the cavity 50 and passageway 58 of mounting block 20 directly into the fluid passageway 62 formed in the dispenser body 24. The solution enters the discharge cavity 96 of dispenser body 24 from the fluid passageway 62, and then flows past and through the valve guide 102 into the discharge outlet 101 of nozzle 98. A short flow path is therefore created through the pressure regulator 14, mounting block 20 and dispenser 12 which minimizes pressure drop due to line losses as the solution flows therethrough.

In addition to the reduction of line losses, the above-described comparatively short flow path between the pressure regulator 14, mounting block 20 and dispenser 12 allows the pressure regulator 14 to maintain the flow of polymer/gas solution released through passageway 58 into dispenser 12 at substantially constant pressure even when the dispenser 12 is operated intermittently. When the needle valve 108 of dispenser 12 is moved to a closed position, the pump (not shown) associated with the source 18 of polymer/gas solution continues to run, thus building pressure at the pressure regulator 14. As the pressure within cavity 50 increases, the piston 72 and valve plate 66 of regulator 14 are moved axially upwardly as viewed in FIG. 1. At a predetermined maximum pressure, which corresponds to the desired application pressure of the solution emitted from dispenser nozzle 98, the valve plate 66 seats against the valve seat 64, thus preventing any further flow of solution into the dispenser 12. With the valve plate 66 of pressure regulator 14 in this seated position, the pressure of the solution downstream from valve plate 66 is maintained at approximately the desired application pressure. That is, the pressure of the solution within the remainder of cavity 50 and passageway 58 of mounting block 20, and the solution within the fluid passageway 62, discharge cavity 96 and nozzle passageway 100 of dispenser 12, is substantially equal to the desired pressure at which the solution should be discharged from the nozzle 98 for application onto a substrate. The pump associated with the solution source 18 continues to operate with the needle valve 108 closed, so that the pressure of the solution immediately upstream from the valve plate 66 of pressure regulator 14 is permitted to increase.

When the needle valve 108 is now moved to an open position, the solution downstream from the valve plate 66 of pressure regulator 14 is emitted through the nozzle 98. No "hammerheads", i.e., enlarged areas of excess material, are initially formed on the substrate because the solution downstream from valve plate 66 has been maintained at substantially the desired application pressure, as described above. The discharge of solution from the nozzle 98 reduces the pressure exerted on the piston 72 of pressure regulator 14, thus allowing the regulator spring 84 to move the piston 72 axially downwardly and unseat the valve plate 66 from valve seat 64. A slight pressure surge occurs within the cavity 50 as pressurized solution located upstream from the valve plate 66 flows therein because such solution was maintained at a pressure in excess of the desired application pressure, as described above. However, this initial surge of solution within cavity 50 of mounting block 20 does not create a "spike" or pressure increase downstream at the nozzle 98 of dispenser 24 because the valve plate 66 quickly operates to control the solution pressure, and because at least some minimal pressure drop occurs in the course of movement of the solution from the upstream side of valve plate 66 to the discharge outlet 101 in the nozzle 98. At the same time, little or no pressure drop occurs at the nozzle 98 in the time it takes for the solution upstream of valve plate 66 to reach the nozzle 98 because of the short flow path and minimal line losses between the regulator 14 and dispenser 24. The pressure in the dispenser 24 therefore transitions from the static condition (no flow) to the dynamic condition (flow) quickly and smoothly, and the pressure profile or level in the dispenser 24 becomes substantially constant within a very short period of time. As a result, a substantially uniform bead or ribbon of foamed polymeric material is deposited by the nozzle 98, without areas of appreciable excess material even if apparatus 10 or 160 are operated intermittently.

The above-described pressure control feature of the apparatus 10 of this invention provides an important advantage in forming a high quality foam from the polymer/gas solution. It has been found desirable to maintain the polymer/gas solution within the dispenser 24 at a pressure which is quite close to but slightly above the pressure at which the gas comes out of solution, in order to ensure the production of "high quality" foam, i.e., a homogeneous solid foam having gas cells substantially evenly distributed throughout the polymeric material. If the pressure of the polymer/gas solution is substantially higher than the pressure at which the gas comes out of solution, the resulting bead has been found to exhibit poor foam quality. On the other hand, maintenance of the polymer/gas solution at too low a pressure within the dispenser 12 can cause the gas to come out of solution prematurely and form foam material within the dispenser 12. Both of these problems are substantially avoided by maintaining the polymer/gas solution at the desired pressure even when the apparatus 10 is operated intermittently.

The pressure at which the gas comes out of solution is dependent upon the polymer material and the "density reduction". The term "density reduction" is meant to refer to the reduction in density of the polymeric material from the unfoamed state to the foamed state. If the density reduction is great, there is a comparatively large amount of gas in solution whereas the density reduction decreases as the amount of gas in solution decreases. In order to produce foam of the desired quality, it is important to control the pressure of the polymer/gas solution within the dispenser 12 within relatively narrow pressure ranges.

One example illustrating the importance of the pressure control provided by the apparatus 10 of this invention is as follows. GE Silicone 1403 polymeric material was injected with gas sufficient to provide a density reduction of approximately 60%. At this density reduction level, a dynamic pressure of 200 psi must be maintained within the dispenser 12 in order to maintain the gas in solution within the polymeric material. For this type of material and particular density reduction, it was found that a dynamic pressure approaching 250 psi within in the dispenser 12 produced a deteriorated foamed bead structure when ejected through nozzle 98. As a result, control of the polymer/gas solution pressure to a level very close to, but slightly above 200 psi at the dispenser nozzle 98, is required to produce the desired foam quality of the resulting foamed polymeric material bead. It can therefore be appreciated that the pressure control obtained by the apparatus 10 of this invention is an important feature in producing the desired foam quality.

OPERATIVELY ADJUSTABLE EMBODIMENT OF FIG. 3

Referring now to FIG. 3, an alternative embodiment is illustrated, which, as described above, includes a modified pressure regulator 200 in which the regulator spring 84 and retainer 88 employed with the pressure regulator 14 of FIG. 1 are removed. As mentioned above, the cavity 204 of pressure regulator 200 is filled with a pressurized fluid, preferably air or nitrogen, supplied from a pressurized fluid source 208 connected by a line 207 to a port 206 in regulator 200. In addition, a pressure transducer 210 is mounted in the port 97 formed in the dispenser body 24 which communicates with the discharge cavity 96.

Adjustment of the extent of axial movement of needle valve 108 in this embodiment is obtained manually in the same manner as described above in connection with FIG. 1, but dynamic variation in the flow rate of polymer/gas solution introduced into the nozzle 98 can be controlled by operation of the pressure regulator 200. The pressure transducer 210 is operative to sense the pressure of the polymer/gas solution flowing through the discharge cavity 96 of dispenser body 24 into the nozzle 98. The pressure transducer 210 produces signals correlated to the pressure of the solution, which are accepted as an input by the controller 92. The controller 92 functions to compare the sensed pressure with a predetermined setpoint or desired pressure level of the polymer/gas solution within the dispenser 12, and produces an output to a valve 212, such as an electric pressure to pneumatic relay valve, carried in the line 207 extending between the pressurized fluid source 208 and the cavity 204 of pressure regulator 14. In response to signals from the controller 92, the valve 212 controls and adjusts the air pressure within the cavity 204, which, in turn, controls the movement of piston 72 and valve plate 66 with respect to the seat 64 within the cavity 50 of mounting block 20. By dynamically controlling the movement of piston 72 and valve plate 66, the pressure at which the polymer/gas solution is discharged from pressure regulator 14 into the passageway 62 of dispenser body 24 can be varied, as desired. In this manner, at least some "operative" control of the pressure of the polymer/gas solution through the apparatus 10 is obtained in the embodiment of FIG. 3.

OPERATIVELY ADJUSTABLE EMBODIMENT OF FIGS. 4-5C

With respect to the embodiment of FIGS. 4-5C, the apparatus 160 illustrated therein is "operatively adjustable" during a production run in two respects. First, as described above, the apparatus 160 provides an economical and reliable means for varying the flow rate of polymer/gas solution discharged from the dispenser 12 between at least a first and second flow rate. In response to signals from the controller 92, pressurized air can be directed via line 175 and valve 213 from air source 209 into the air cavity 115 of dispenser 12 to move the needle valve 108' to the first, partially open position. If desired, the pressurized air can also be supplied through line 172 and valve 213a to the air cavity 115a of flow control module 164 to move the needle valve 108' of the dispenser 12 to a second, completely open position as described above. The apparatus 160 therefore provides for at least a two-stage adjustment of the position of needle valve 108' of dispenser 12 during a production run, as desired.

The above-described two-stage movement of needle valve 108' of dispenser 12 has proven to be particularly advantageous when the apparatus 160 is utilized to apply foamed polymeric material in a non-linear path upon a substrate. For example, in the course of traversing a non-linear path consisting of a straight portion, a curved or arcuate portion and then another straight portion, it has been found advantageous to discharge the polymer/gas solution from the dispenser 12 at two different flow rates. Preferably, the polymer/gas solution is discharged at a relatively high flow rate when the apparatus 160 or substrate are moving along a linear or straight path relative to one another, i.e., with the needle valves 108' at the second, more fully open position shown in FIG. 5C. On the other hand, when either the apparatus 160 or substrate is moved in a non-linear or curved path, the controller 92 functions to stop the flow of pressurized air from source 208 into the air cavity 115a of flow control module 164 so that the needle valve 108' of dispenser 12 returns to the first, partially open position. See FIG. 5B. In this position, a lower flow rate of polymer/gas solution is discharged from the dispenser 12, which is advantageous when traversing non-linear or curved flow paths because when the dispenser speed exceeds the speed of bead extrusion, internal tension is produced in viscoelastic material. This internal tension causes the bead to pull inwardly at the corner. Once the apparatus 160 or substrate is again moved along a linear path, the controller 92 is operated to resume the flow of operating air into the air cavity 115a of flow control module 164 to return the needle valve 108' of dispenser 12 to the second, fully open position. This resumes the higher flow rate of polymer/gas solution through the nozzle 190.

The apparatus 160 is also operatively adjustable in the same manner as the embodiment of FIG. 3 described above when it is coupled to the pressure regulator 200 as shown in FIG. 4. That is, the pressure of the polymer/gas solution supplied to the dispenser 12 can be controlled by controller 92 and regulator 200 in the identical manner described above in connection with FIG. 3.

While the invention has been described with reference to a preferred embodiment, it will be understood by those skilled in the art that various changes may be made and equivalents may be substituted for elements thereof without departing from the scope of the invention. Therefore, it is intended that the invention not be limited to the particular embodiment disclosed as the best mode contemplated for carrying out this invention, but that the invention will include all embodiments falling within the scope of the appended claims.

We claim:

1. Apparatus for dispensing a polymer foam, comprising:
   dispenser means for discharging a polymer foam;
   regulator means, connected to said dispenser means, for introducing a pressurized solution of intermixed, highly viscous polymeric material and gas into said dispenser means and for maintaining the pressurized solution introduced into said dispenser means at a pressure which is slightly above the pressure at which the gas comes out of solution so that upon discharge of the pressurized solution from the dispenser means a substantially homogeneous polymer foam is formed.

2. Apparatus for forming and dispensing a polymer foam, comprising:
   forming means for forming a pressurized solution of intermixed, highly viscous polymeric material and gas;
   dispenser means for receiving the pressurized solution;
   regulator means interposed between said forming means and said dispenser means for maintaining the pressurized solution introduced into said dispenser means at a pressure which is slightly above the pressure at which the gas comes out of solution so that upon discharge of the pressurized solution from the dispenser means a polymer foam is formed homogeneous.

3. The apparatus of claim 2 in which said dispenser means is a dispenser formed with a fluid passageway having a first inlet and a discharge outlet, and said regulator means is a pressure regulator having a second inlet connected to said forming means and a second outlet, said second outlet of said pressure regulator being located proximate to said dispenser and being connected to said first inlet thereof.

4. Apparatus for forming and dispensing a polymer foam, comprising:
   forming means for forming a pressurized solution of intermixed, highly viscous polymeric material and gas;
   dispenser means for receiving the pressurized solution;
   regulator means interposed between said forming means and said dispenser means for reducing the pressure of the pressurized solution from a first, higher pressure upstream from said regulator means to a second, lower pressure within said dispenser means, said second, lower pressure being maintained at a level by said regulator means which is slightly above the pressure at which the gas comes out of solution so that upon discharge of the pressurized solution from the dispenser means a homogeneous polymer foam is formed.

5. Apparatus for dispensing a pressurized solution of intermixed highly viscous polymeric material and gas to form a polymer foam, comprising:
   a pressure regulator formed with an internal cavity having a first inlet adapted to connect to a source of the solution and a first outlet, said pressure regulator including regulator means for controlling the pressure at which the solution is discharged through said first outlet of said internal cavity;
   a dispenser formed with a fluid passageway having a second inlet and a second discharge outlet, said fluid passageway carrying a valve having a valve tip movable between an open position and a closed position relative to said second discharge outlet, said second inlet of said fluid passageway in said dispenser being connected to said first outlet of said internal cavity of said pressure regulator so that a flow path for the solution is formed between said internal cavity and said second discharge outlet of said fluid passageway within which sufficient pressure is maintained to substantially prevent the gas from leaving solution to form a polymer foam prior to discharge from said dispenser.

6. The apparatus of claim 5 in which said dispenser is formed with a first passageway connected to said first outlet of said pressure regulator, a nozzle having a bore terminating in a discharge outlet, and a fluid cavity connected between said first passageway and said nozzle, said first passageway, fluid cavity and nozzle bore collectively defining said fluid passageway of said dispenser, said valve being carried within said bore of said nozzle so that said valve tip seats against said discharge outlet of said nozzle in said closed position.

7. The apparatus of claim 5 in which said dispenser includes sensor means communicating with said fluid passageway for sensing the pressure of the solution passing through said fluid passageway, said sensor means sending signals correlated to the pressure of the solution in said fluid passageway to a controller which is effective to control the operation of said regulator means of said pressure regulator and thus control the pressure at which the solution is discharged into said fluid passageway of said dispenser.

8. Apparatus for dispensing high viscosity fluid material, comprising:
 a pressure regulator formed with an internal cavity having an inlet adapted to communicate with a source of high viscosity fluid material, and an outlet;
 a dispenser formed with a fluid passageway having an inlet connected to said outlet of said pressure regulator and a discharge outlet for dispensing fluid material, said dispenser having a valve which is movable between an open position and a closed position with respect to said discharge outlet of said fluid passageway;
 regulator means carried within said internal cavity of said pressure regulator for maintaining the solution at a first pressure within said fluid passageway in said dispenser, and for maintaining the solution at a higher, second pressure upstream from said pressure regulator, with said valve in said closed position, said regulator means being effective upon movement of said valve to said open position to reduce the pressure of the fluid material as it passes through said pressure regulator and to transmit said fluid material into said fluid passageway of said dispenser without producing a pressure surge or a pressure drop in the fluid material before it is emitted from said dispenser.

9. The apparatus of claim 8 in which said pressure regulator and said dispenser are directly mounted to one another so that said outlet of said pressure regulator directly connects to said inlet of said fluid passageway in said dispenser, whereby a flow path is formed between said pressure regulator and said discharge outlet of said fluid passageway within which a pressure drop of the solution due to line losses is substantially eliminated.

10. The apparatus of claim 8 in which said dispenser includes sensor means communicating with said fluid passageway for sensing the pressure of the solution passing through said fluid passageway, said sensor means sending signals correlated to the pressure of the solution to a controller which is effective to control the operation of said regulator means of said pressure regulator and thus control the pressure at which the solution is discharged into said fluid passageway of said dispenser.

11. Apparatus for dispensing high viscosity fluid material, comprising:
 a dispenser, including:
  (i) a dispenser body formed with a fluid passageway having an inlet, and a discharge outlet for emitting fluid material;
  (ii) a valve carried by said dispenser body having a valve tip axially movable with respect to said discharge outlet;
  (iii) valve closure means for moving said valve to a closed position relative to said discharge outlet;
  (iv) activating means for axially moving said valve in a first direction away from said discharge outlet;
  (v) stop means for limiting the extent of axial movement of said valve relative to said discharge outlet to control the flow of fluid material therethrough;
  (vi) adjustment means for adjusting the position of said stop means relative to said valve to vary the extent of axial movement of said valve which is permitted by said stop means;
 a pressure regulator formed with an internal cavity having an inlet adapted to communicate with a source of fluid material, and an outlet connected to said inlet of said fluid passageway in said dispenser body, said pressure regulator including regulator means which is effective upon operation of said valve closure means of said dispenser to maintain the fluid material within said fluid passageway in said dispenser at a first pressure and to maintain the fluid material upstream from said pressure regulator at a second, higher pressure, said regulator means being effective upon operation of said activating means of said dispenser to reduce the pressure of the fluid material upstream from said pressure regulator as it passes therethrough and to transmit the fluid material into said fluid passageway of said dispenser without producing a pressure surge or a pressure drop in the fluid material before it is emitted from the dispenser.

12. The apparatus of claim 11 in which said adjustment means comprises:
 a first member formed with means for retaining said stop means in a rotatably fixed position;
 a second member carried by said dispenser body having a bore for receiving said stop means, said first and second members having means for releasably mounting said first member onto said second member in a rotatably fixed position;
 retainer means extending between said stop means and said first member for urging said first member into engagement with said second member.

13. The apparatus of claim 11 in which said dispenser includes sensor means communicating with said fluid passageway of said dispenser for sensing the pressure of the solution passing through said fluid passageway, said sensor means sending signals correlated to the pressure of the solution to a controller which is effective to control the operation of said regulator means of said pressure regulator and thus control the pressure at which the solution is discharged into said fluid passageway of said dispenser.

14. Apparatus for dispensing high viscosity fluid material comprising:
   a dispenser including:
      (i) a dispenser body formed with a fluid passageway having an inlet, and a discharge outlet for emitting fluid material;
      (ii) a valve carried by said dispenser body which is movable with respect to said discharge outlet of said fluid passageway;
      (iii) valve closure means for moving said valve to a closed position relative to said discharge outlet;
      (iv) first actuating means for moving said valve in a direction away from said discharge outlet;
   a flow control module connected to said dispenser, said flow control module including:
      (i) stop means for limiting the extent of axial movement of said valve relative to said discharge outlet;
      (ii) means for positioning said stop means in a first position relative to said valve such that said valve is permitted to move to a first, open position with respect to said discharge outlet in response to operation of said first actuating means;
      (iii) second actuating means for moving said stop means to a second position relative to said valve such that said valve is permitted to move to a second, open position with respect to said discharge outlet in response to operation of said first actuating means;
   a pressure regulator formed with an internal cavity having an inlet adapted to communicate with a source of fluid material, and an outlet connected to said inlet of said fluid passageway in said dispenser, said pressure regulator including regulator means which is effective upon operation of said valve closure means of said dispenser to maintain the fluid material within said fluid passageway in said dispenser at a first pressure and to maintain the fluid material upstream from said pressure regulator at a second, higher pressure, said regulator means being effective upon operation of said first actuating means of said dispenser to reduce the pressure of the fluid material upstream from said pressure regulator as it passes therethrough and to transmit the fluid material into said fluid passageway of said dispenser without producing a pressure surge or a pressure drop in the fluid material before it is emitted from said dispenser.

15. The apparatus of claim 14 in which said dispenser carries a nozzle including an elongated throughbore having a first diameter forming a portion of said fluid passageway of said dispenser which terminates with said discharge outlet, said valve being formed with an elongated valve tip having a second diameter which is sized relative to said first diameter of said elongated throughbore of said nozzle so that said elongated valve tip forms a flow restriction within said elongated throughbore, said valve tip being movable to a first position within said nozzle throughbore relative to said discharge outlet thereof upon movement of said valve to said first, open position to provide a flow restriction which produces a first flow rate of the fluid material, and said valve tip being movable to a second position further from said discharge outlet upon movement of said valve to said second, open position to provide a flow restriction which produces a second, higher flow rate of the fluid material.

16. The apparatus of claim 14 in which said dispenser includes sensor means communicating with said fluid passageway for sensing the pressure of the fluid material passing through said fluid passageway, said sensor means sending signals correlated to the pressure of the fluid material to a controller which is effective to control the operation of said regulator means of said pressure regulator and thus control the pressure at which the fluid material is discharged into said fluid passageway of said dispenser.

17. Apparatus for dispensing fluid material, comprising:
   a dispenser formed with a fluid passageway having an inlet adapted to connected to a source of fluid material, and a discharge outlet for emitting the fluid material;
   a valve carried by said dispenser which is movable with respect to said discharge outlet of said fluid passageway;
   first biasing means for applying a continuous force to said valve which urges said valve toward a closed position relative to said discharge outlet of said fluid passageway;
   first actuating means for counteracting the force of said first biasing means so that said valve moves in a direction away from said discharge outlet;
   a flow control module connected to said dispenser, said flow control module including:
      (i) stop means for limiting the extent of axial movement of said valve relative to said discharge outlet;
      (ii) second biasing means for applying a continuous force to said stop means which urges said stop means to a first position relative to said valve, said valve being permitted to move to a first, open position with respect to said discharge outlet with said stop means in said first position in response to operation of said first actuating means;
      (iii) second actuating means for counteracting the force of said second biasing means which urges said stop means to a second position relative to said valve, said valve being permitted to move to a second, open position with respect to said discharge outlet with said stop means in said second position in response to operation of said first actuating means;
   first adjustment means associated with said dispenser and said flow control module for varying the location of said first position of said stop means of said flow control module relative to said valve of said dispenser, said first adjustment means comprising:
      (i) a shaft connected to said flow control module, said shaft being formed with a threaded portion which is received within a threaded bore formed in said dispenser body, said shaft being formed with a throughbore which receives said stop means;
      (ii) a first member formed with means for retaining said stop means in a rotatably fixed position;
      (iii) a second member carried by said dispenser body having a bore for receiving said stop means, said first and second members having means for releasably mounting said first member onto said second member in a rotatably fixed position;

(iv) retainer means extending between said stop means and said first member for urging said first member into engagement with said second member.

18. The apparatus of claim 17 in which said stop means is a plunger having a first end positioned to make contact with said valve of said dispenser, and a second end which mounts a piston within an air cavity formed in said flow control module.

19. The apparatus of claim 17 further including a second adjustment means associated with said flow control module for varying the location of said second position of said stop means of said flow control module relative to said valve of said dispenser, said second adjustment means comprising:

a shaft formed with a threaded portion which is rotatably received within a threaded bore formed in said flow control module and axially adjustable therealong, said shaft having an end engageable with said stop means of said control module;

a first member formed with means for retaining said shaft in a rotatably fixed position;

a second member carried by said flow control module having a bore for receiving said shaft, said first and second members having means for releasably mounting said first member onto said second member in a rotatably fixed position;

retainer means extending between said stop means and said first member for urging said first member into engagement with said second member so that said first member and said shaft are retained in a rotatably fixed position on said flow control module.

20. Apparatus for dispensing a polymer foam, comprising:

means for forming a pressurized solution of intermixed, highly viscous polymeric material and gas;

means for transmitting the pressurized solution at a first pressure to a pressure regulator;

means associated with said pressure regulator for reducing the pressure of the pressurized solution from said first pressure to a second, lower pressure in the course of passage of the pressurized solution through said pressure regulator and into a dispenser located downstream from said pressure regulator, said second, lower pressure being maintained at a level within said dispenser which is slightly above the pressure at which the gas comes out of solution so that upon discharge of the pressurized solution from said dispenser a homogeneous polymer foam is formed.

21. The method of dispensing a polymer foam, comprising:

transmitting a pressurized solution of intermixed, highly viscous polymeric material and gas into a dispenser means;

maintaining the pressurized solution introduced into said dispenser means at a pressure which is slightly above the pressure at which the gas comes out of solution so that upon discharge of the pressurized solution from the dispenser means a homogeneous polymer foam is formed.

22. The method of dispensing a polymer foam, comprising:

forming a pressurized solution of intermixed, highly viscous polymeric material and gas;

transmitting the pressurized solution to a dispenser means;

maintaining the pressurized solution introduced into said dispenser means at a pressure which is slightly above the pressure at which the gas comes out of solution so that upon discharge of the pressurized solution from the dispenser means a homogeneous polymer foam is formed.

23. The method of dispensing a polymer foam, comprising:

forming a pressurized solution of intermixed, highly viscous polymeric material and gas;

transmitting the pressurized solution to a dispenser means;

reducing the pressure of the pressurized solution from a first, higher pressure upstream from said dispenser means to a second, lower pressure within said dispenser means by operation of a regulator means located immediately upstream from said dispenser means, said second, lower pressure being maintained at a level by said regulator means which is slightly above the pressure at which the gas comes out of solution so that upon discharge of the pressurized solution from the dispenser means a homogeneous polymer foam is formed.

24. The method of dispensing a polymer foam, comprising:

forming a pressurized solution of intermixed, highly viscous polymeric material and gas;

transmitting the pressurized solution to a pressure regulator means at a first pressure;

reducing the pressure of the pressurized solution from the first pressure to a second, lower pressure in the course of passage of the pressurized solution through the pressure regulator means to a dispenser means located downstream from the pressure regulator means, the second, lower pressure being maintained at a level within the dispenser means which is slightly above the pressure at which the gas comes out of solution so that upon discharge of the pressurized solution from the dispenser means a homogeneous polymer foam is formed.

25. The method of dispensing a highly viscous fluid material, comprising:

maintaining the fluid material located in a flow passageway between a pressure regulator and the discharge outlet of a dispenser at a predetermined application pressure, and maintaining the fluid material between the pressure regulator and a source of fluid material at a pressure in excess of the application pressure, with the valve means of the dispenser in a closed position relative to the discharge outlet thereof;

providing a flow path between the pressure regulator and discharge outlet of the dispenser such that upon movement of the valve means to an open position the fluid material located downstream from the pressure regulator is emitted from the discharge outlet at substantially the predetermined application pressure, and such that the fluid material located upstream from the pressure regulator is emitted from the discharge outlet of the dispenser at substantially the predetermined application pressure.

26. The method of intermittently dispensing a highly viscous fluid material, comprising:

closing the discharge outlet of a flow passageway formed between a dispenser and a pressure regulator;

maintaining fluid material located within said flow passageway at a predetermined application pressure, and maintaining fluid material located upstream from the pressure regulator at a pressure in excess of said predetermined application pressure, with the discharge outlet closed;

opening said discharge outlet of said flow passageway to emit fluid material located therein from said discharge outlet at substantially the predetermined application pressure;

transmitting the fluid material located upstream from the pressure regulator into said flow passageway so that said fluid material is emitted from said discharge outlet at substantially the predetermined application pressure.

* * * * *

UNITED STATES PATENT AND TRADEMARK OFFICE
CERTIFICATE OF CORRECTION

PATENT NO.   : 5,207,352
DATED        : May 4, 1993
INVENTOR(S)  : Porter et al.

It is certified that error appears in the above-identified patent and that said Letters Patent is hereby corrected as shown below:

Column 10, line 3, "Fig." should be -- Fig. 1 --.

Column 18, line 27, insert "homogenous" before the word "polymer".

Column 18, line 28, delete the word "homogenous".

Signed and Sealed this

Eighth Day of November, 1994

Attest:

BRUCE LEHMAN

Attesting Officer          Commissioner of Patents and Trademarks